No. 646,219. Patented Mar. 27, 1900.
W. HOWARD.
CORN HARVESTER.
(Application filed Feb. 1, 1900.)

(No Model.)

WITNESSES:
Geo. W. Naylor

INVENTOR
Wilson Howard
BY
ATTORNEYS

THE NORRIS PETERS CO., PHOTO-LITHO., WASHINGTON, D. C.

UNITED STATES PATENT OFFICE.

WILSON HOWARD, OF BELVIDERE, KANSAS.

CORN-HARVESTER.

SPECIFICATION forming part of Letters Patent No. 646,219, dated March 27, 1900.

Application filed February 1, 1900. Serial No. 3,599. (No model.)

*To all whom it may concern:*

Be it known that I, WILSON HOWARD, a citizen of the United States, residing at Belvidere, in the county of Kiowa and State of Kansas, have invented a new and Improved Corn-Harvester, of which the following is a full, clear, and exact description.

The objects of my invention are to provide a corn-harvester of the sled type which will be perfect in operation, of minimum cost, and of great durability, and, furthermore, to so construct the harvester that it may be made to harvest corn in one or in two rows, as may be desired, and so that the moment the horse quits pulling or the driver leaves his seat the knife or knives will be automatically carried beneath a platform, so that they will not come in lacerating contact with any object that the harvester may strike at the point where the knives are located. Thus the machine is rendered safe while at rest, and the knives are at the same time protected.

Another object of the invention is to so construct the harvester that it will not wabble or tip while in operation.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in both figures.

Figure 1:
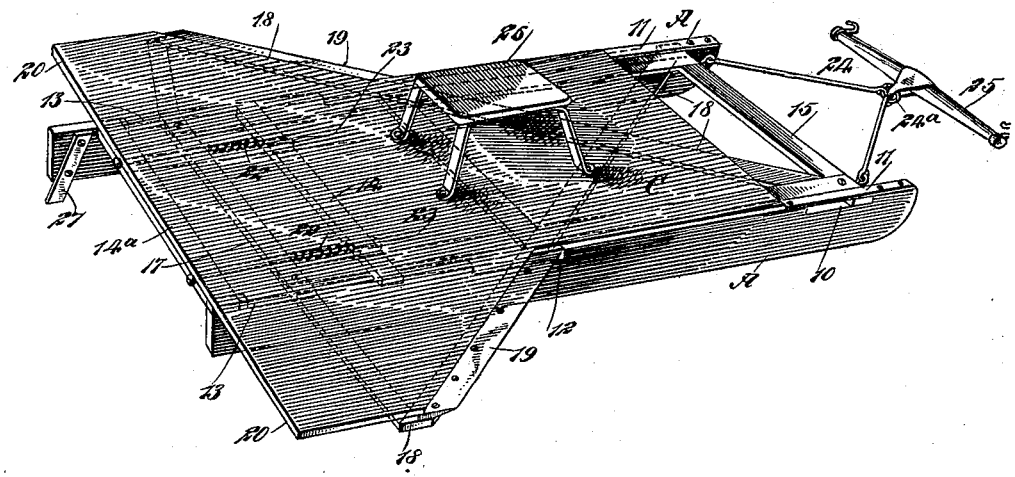
Figure 2:
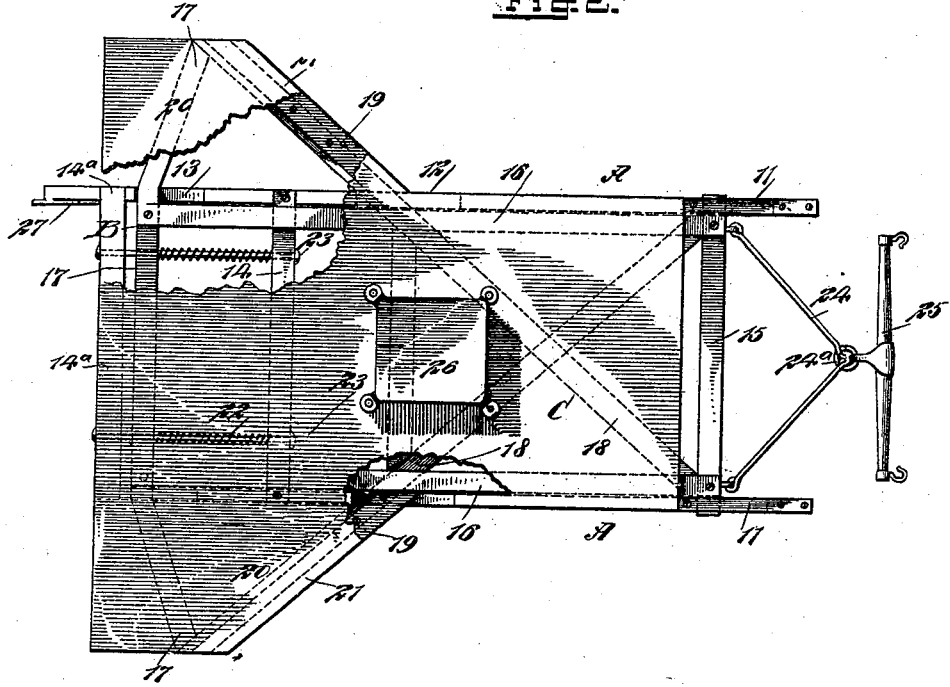

Figure 1 is a perspective view of the improved harvester, showing the knives in position for cutting; and Fig. 2 is a plan view of the improved harvester, parts being broken away and the knives being beneath the platform or concealed.

Two parallel runners A are employed, and these runners are preferably made quite long and are of any desired depth. Each runner is provided in its upper edge, near its forward end, with a longitudinal slot 10, covered by suitable straps 11, and each runner is furthermore provided with a second slot 12 in its upper edge, at or near the center, and with a third slot 13, also in the upper edge, at or near its rear end. The runners are connected between their centers and rear ends by suitable braces 14 and 14ª.

A frame B is mounted to slide between the runners. This frame consists of a front bar 15, the ends whereof extend into the forward slots 10 of the runners, side bars 16, which are attached to the front bar and extend rearwardly along the inner faces of the runners, and a rear cross-bar 17, which connects the side bars 16 and extends into the rear slots 13 of the runners and beyond said runners.

If the harvester is designed to simultaneously cut two rows of corn, two diagonal bars 18 are added to the frame B. These bars extend out through the central slots 12 in the runners a desired distance, and their inner ends are attached to opposite corners of the frame B at the front; but if the machine is designed to cut only one row of corn but one of the said bars 18 need be employed. A knife 19 is secured to the outer end portion of each bar 18, said knives extending forwardly, following the inclination of the bars 18, and preferably the heels of the knives extend through the central slots 12 and the outer extremities of the knife-bars are attached to the ends of the sliding cross-bar 17.

A platform C is secured to the upper portion of the runners, extending from a point near the front to the rear, and when the machine is provided with two knives the platform is provided with two wings 20, one at each side, the forward edges of which wings have the same inclination as the knives 19, and normally the knives are located beneath the said wings at their forward edges 21. The knives 19 are normally held in this concealed position by means of guide-pins 23, which extend through the rear cross-bar 17 of the frame B and are rigidly held in the brace-bars 14 and 14ª of the runners, and springs 22 are coiled around these pins between the two bars. These springs are sufficiently strong to prevent the knives being drawn out when an animal attached to the forward portion of the sliding frame draws forwardly thereon, as it requires the additional weight of the driver on the platform before the knives will be carried to cutting position by the tension exerted on the frame by the draft-animal.

When the knives are in their normal position, the extended portions of the frame B are at the rear ends of the slots in the runners, and when the knives are in cutting position these extended portions of the frame are at the forward ends of said slots or near said ends.

Links 24 are secured to the forward end of the frame B, one at each side, and these links are connected by a ring 24ª, which is in line with the longitudinal axis of the machine, and the singletree 25 is attached to this ring, as shown in the drawings. The driver's seat 26 is located at the central portion of the platform, just between the heels of the knives. In this manner the weight of the driver is distributed and the runners are prevented from leaving the ground at the front. As soon as the draft-animal stops the springs 22 act to draw the knives beneath the wings of the platform, and in the event the driver should leave his seat and the animal still continue to travel the springs will still act to draw the knives under the platform.

In this machine there are no expensive castings or cog-gear to break or wear out. There are no trunnions to be oiled or to collect dust or grit and cut out. The construction is extremely simple, there being no complicated parts to get out of gear, and, furthermore, there are no running parts to cause friction, jolt, or jar.

When the machine is used as a single machine, in order to prevent wabbling I locate a share 27 on the rear of the runner opposite that near which the blade is placed; but when the machine is a double one this share 27 may be dispensed with. To further control the wabbling motion developed by the side draft upon the knife, I have arranged that the draft shall be applied to the forward end of the runners, thus holding them to a vertical line of draft, and this, in addition to the share 27, accomplishes the desired result. The actuating-springs, as stated, are intended to be so regulated as to strength that they will require the addition of the driver's weight to cause them to be overcome, so that while the knives may be easily advanced into the operative position when so desired and held there rigidly yet immediately upon stopping the horse or the removal of the driver's weight the knife is at once withdrawn beneath the wings of the platform. The harvester is thus rendered perfectly safe both as respects the horse and the driver.

Great efficiency is gained by more perfect construction than heretofore employed—namely, the use of runners instead of wheels, the increased length of the body, and the proper disposition of the weight of the driver. The runners increase the draft of course; but they compensate for that many times over by steadying the motion. They act as a governor to prevent a rebound every time the strain of cutting a hill of corn is relieved, and a steady even motion is one of the prime essentials of a harvester constructed as above stated. The great length of the runners acts to restrain the wabbling motion produced by the side draft developed by the use of a single knife, should such be preferred.

Having thus described my invention, I claim as new and desire to secure by Letters Patent—

1. A corn-harvester, comprising runners, a platform carried by the runners, a spring-controlled frame held to slide between the runners and having a projecting arm over which the platform extends, and a knife secured to the said arms, the springs of the frame acting normally to draw the knife beneath the platform.

2. In a corn-harvester, runners, a platform carried by the runners, the platform being provided with a wing at one side having an inclined forward edge, a spring-controlled frame having limited and guided sliding movement on the runners, the said frame being provided with a diagonal extension adapted to extend beneath the wing of the platform, a blade secured to said extension, and a draft device connected to the forward portion of the frame, the springs of the frame acting to normally hold the blade beneath the wing of the platform.

3. In a corn-harvester, runners, a platform carried by the runners and having an extension beyond the outer side of a runner, a frame mounted to slide upon the said runners, a projection from the frame adapted to extend beneath the platform, a knife carried by the said extension, springs acting on the frame to normally hold the knife beneath the platform, a seat centrally placed on the platform, and a draft device connected with the forward end of the frame, the springs acting on the frame being of sufficient strength to require the full power of the draft-animal attached to the draft device and the added weight of the driver, before the said springs can be overcome and the knife be brought to cutting position.

In testimony whereof I have signed my name to this specification in the presence of two subscribing witnesses.

WILSON HOWARD.

Witnesses:
J. W. HUTCHISON,
S. G. SHELTON.